United States Patent [19]

Hashimoto

[11] Patent Number: 4,974,253
[45] Date of Patent: Nov. 27, 1990

[54] SYSTEM AND METHOD FOR CONTROLLING FACSIMILE APPARATUS IN RESPONSE TO A COMPUTER GENERATED SIGNAL OR A CNG SIGNAL

[75] Inventor: Kazuo Hashimoto, Tokyo, Japan
[73] Assignee: Hashimoto Corporation, Tokyo, Japan
[21] Appl. No.: 291,614
[22] Filed: Dec. 29, 1988

[30] Foreign Application Priority Data

Dec. 31, 1987 [JP] Japan .................. 62-335047

[51] Int. Cl.⁵ .................. H04M 11/00; H04M 1/64
[52] U.S. Cl. .................. 379/100; 379/74; 379/77; 379/82; 379/88; 379/97; 379/102
[58] Field of Search .................. 379/100, 102, 96–98, 379/104, 105, 70, 74, 77, 79, 82, 85, 88

[56] References Cited

U.S. PATENT DOCUMENTS

| | | | |
|---|---|---|---|
| 4,584,434 | 4/1986 | Hashimoto | 379/100 |
| 4,596,021 | 6/1986 | Carter et al. | 379/98 |
| 4,660,218 | 4/1987 | Hashimoto | 379/82 |
| 4,868,865 | 9/1989 | Ogawa et al. | 379/100 |

FOREIGN PATENT DOCUMENTS

| | | | |
|---|---|---|---|
| 2657023 | 6/1978 | Fed. Rep. of Germany . | |
| 0161767 | 7/1988 | Japan | 379/93 |
| 63-224456 | 9/1988 | Japan . | |
| 63-254849 | 10/1988 | Japan . | |
| 63-256047 | 10/1988 | Japan . | |
| 2166624 | 5/1986 | United Kingdom | 379/102 |
| 2183427 | 6/1987 | United Kingdom . | |
| 2213681 | 8/1989 | United Kingdom | 379/100 |

Primary Examiner—Jin F. Ng
Assistant Examiner—Wing F. Chan
Attorney, Agent, or Firm—Lowe, Price, LeBlanc, Becker & Shur

[57] ABSTRACT

A facsimile apparatus connected to a telephone line and incorporating an automatic telephone answering and recording device, which is able to be responsive to various inputs, for example, a calling tone (CNG) or similar signal sent from a calling party's apparatus, or a specified signal sent by a calling party by pushing a DTMF tone button. If a user picks up a handset of a telephone set connected to the telephone line during the operation of the automatic telephone answering device, the facsimile apparatus is not energized and returns to the standby mode in response to the off-hook operation of the telephone set, so that he or she can talk directly with the calling party. And during the telephone conversation between calling and called parties, the facsimile apparatus can be energized in response to manual operation, for instance, pushing of a button by either of the parties.

5 Claims, 1 Drawing Sheet

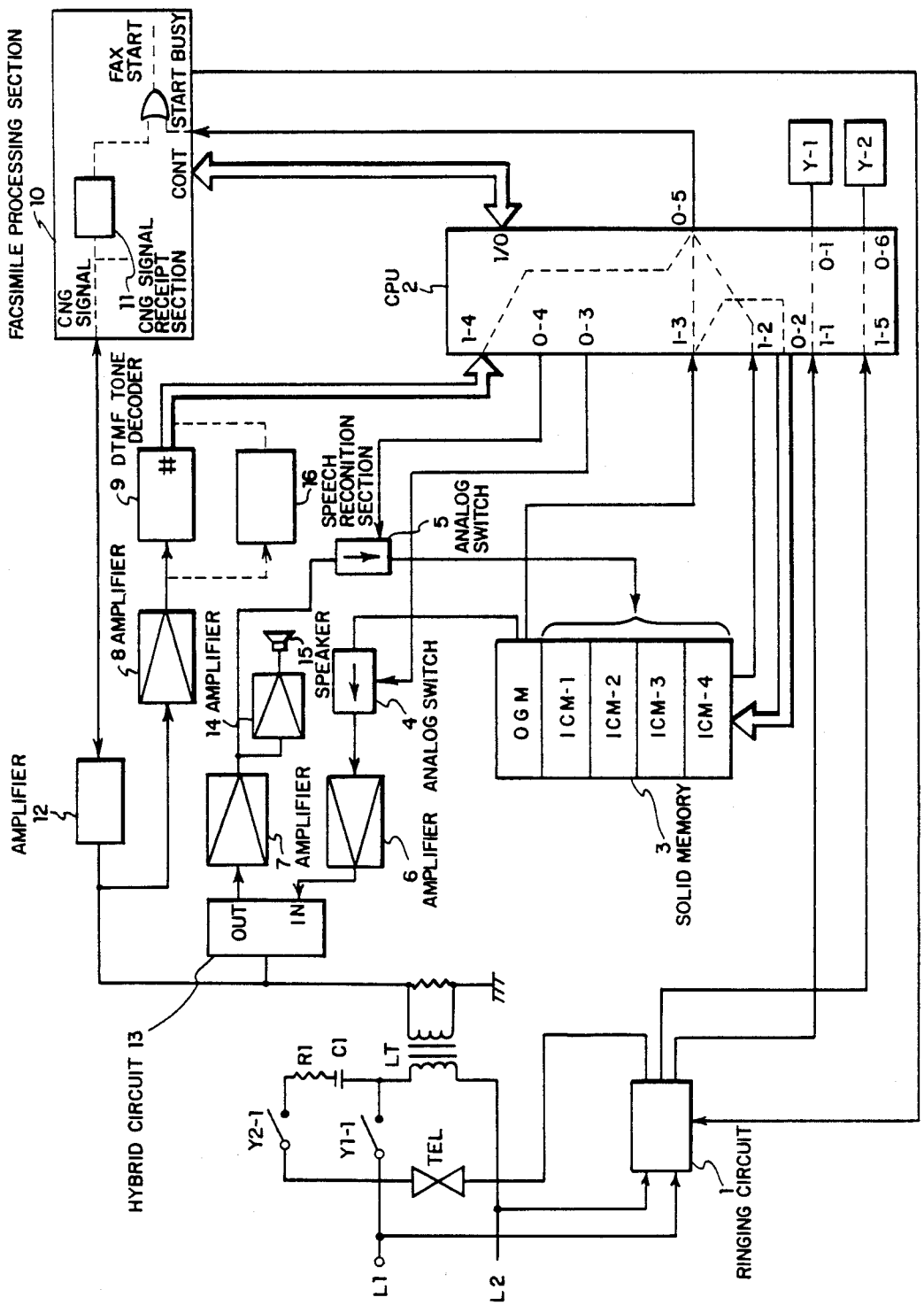

SYSTEM AND METHOD FOR CONTROLLING FACSIMILE APPARATUS IN RESPONSE TO A COMPUTER GENERATED SIGNAL OR A CNG SIGNAL

BACKGROUND OF THE INVENTION

The facsimile apparatus has made rapid progress recently in the U.S. market. In a conventional facsimile apparatus, there is developed a machine which combines with an automatic telephone answering device or uses one telephone line by shifting between the facsimile apparatus and a telephone set. However, each of the apparatus has its merits and demerits for practical use, so that a user has been confused which one to choose.

SUMMARY OF THE INVENTION

The present invention relates to a facsimile apparatus incorporating a telephone answering machine.

It is an object of the present invention to provide a facsimile apparatus (FAX) incorporating a telephone answering machine (TAM) wherein an incoming telephone call is received and answered first by the TAM and thereafter the FAX is energized.

It is another object of the present invention to provide a facsimile apparatus (FAX) incorporating a telephone answering machine (TAM) wherein the engaging circuit is formed by the TAM in response to an incoming telephone call and thereafter means for shortening the access time for the FAX is provided.

It is a further object of the present invention to provide a facsimile apparatus (FAX) incorporating a telephone answering machine (TAM) wherein, during the operation of the TAM, off-hook operation by a called party enables both the called and calling parties to talk to each other without energizing the FAX.

It is further object of the present invention to provide a facsimile apparatus (FAX) incorporating a telephone answering machine (TAM), wherein during a telephone conversation between both called and calling parties described in the above object, the called party's FAX can be energized in response to the depression of certain manual operation button of a push-button telephone by either of the two parties, without disengaging a telephone line.

It is a further object of the present invention to provide a facsimile apparatus (FAX) which is able to be responsive to various energizing signals. These signals include an output of a calling tone (CNG) signal which is used in almost all FAX apparatus, or the inputs from various interfaces to a CPU (microprocessor) for applying a controlled output thereof to an OR logic circuit.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The figure is a circuit diagram explaining the principle of this invention.

BEST MODE FOR PRACTICING THE INVENTION

The arrangement and operation in the preferred embodiment of the invention will now be described. The drawing describes a construction of a facsimile apparatus as an example of this invention. In the drawing, reference symbols L1 and L2 denote terminals of a telephone line. Reference symbols TEL denote a telephone set. Reference numeral 1 denotes a ringing circuit for detecting a calling signal, the circuit having a means for detecting an on-hook condition by the calling party and a means for detecting an on-hook condition of the telephone set TEL, which uses a common part of the ringing circuit 1. When a facsimile processing section which will be described later is operated (which means is in a busy condition), the above means for detecting the on-hook is not operated.

Reference numeral 2 denotes a micro computer of one chip (herein after it is called a CPU) which sets the ROM (read-only memory). In the CPU 2, reference symbols I-1–I-4 denote input ports. Reference symbol 0-1–0-5 denote output ports. The keyboard for operating, which is not shown in the drawing, is connected to the CPU 2. Reference numeral 3 denotes a solid state memory which can record and playback the outgoing message (OGM) and four messages (ICM-1–ICM-4). Reference numerals 4 and 5 denote analog switches. Reference numerals 6, 7, 8, and 14 denote amplifiers. Reference numeral 9 denotes a tone decoder for decoding a PB tone (DTMF) sent for starting the facsimile device by the calling party, as will be described later. Reference numeral 10 denotes a facsimile processing section.

When the facsimile processing section 10 is set to the receive mode by the keyboard (not shown in the drawing), a video signal which is inputted after a signal of an H level (start signal) is inputted to the START terminal, is recorded on paper (not shown in the drawing). In this recording operation, the BUSY terminal is set to the H level, and this output is input to the ringing circuit (this operation will be described later).

Reference numeral 11 denotes a CNG signal receipt section. Reference numeral 12 denotes a bidirectional amplifier. Reference numeral 13 denotes a hybrid circuit which prevents input of the outgoing message which is input to the input terminal, to the output terminal OUT. The voice from the calling party input through the line transformer LT is output from the output terminal OUT. Reference numeral 15 denotes a speaker.

Operation of the invention will now be described as follows. The solid state memory 3 is divided into five areas as shown in the drawing, and the outgoing message OGM is recorded previously in part of the solid state memory 3. The device is set to the receive mode by the keyboard (not shown in the drawing). In the above waiting condition, when the calling signal is input to the telephone line L1, L2, the calling signal is detected by the ringing circuit 1, and keeps the relay Y-1 in an ON condition through the input port I-1 of the CPU 2. As a result, the telephone lines L1, L2 are set to the closed condition to form a main loop through the contacts y1-1 and the line transformer LT, and the calling signal stops, the condition of talking over the telephone is set. The output port O-3 of the CPU 2 is set to the H level by the program, and the analog switch 4 is set to ON. Thereafter, playback of the outgoing message OGM starts in accordance with the code sent through the output port O-2. The outgoing message is output through the amplifier 6, the hybrid circuit 13, and the line transformer LT. When the calling party does not need to use the facsimile apparatus, and it is possible to record the incoming message (ICM) in the solid state memory 3, and when the end of the outgoing message OGM is detected through the input port I-3 of the CPU 2, the analog switch 4 is set to OFF and the analog switch 5 is set to ON through the output port O-4 of the CPU 2. The range of the memory for the first incoming message ICM-1, for example, is designated through the output port O-2. Accordingly, the incoming message from the calling party is recorded in the position of ICM-1 in the solid state memory through the line transformer LT, the hybrid circuit 13, the amplifier 7, and the analog switch 5.

As above, when the calling party does not need to use the facsimile apparatus, and the end of recording the incoming message is detected through the input port I-2 of the CPU, the signal of H level is output from the output port O-5, and this signal is input to the START terminal of the facsimile processing section, and the facsimile processing section is operated. A discrimination signal by operating the facsimile processing device 10, which is well known (CED signal for example), is sent to the calling party through the SIGNAL terminal and the amplifier 12.

If the caller does not need to use the facsimile apparatus, when the calling party hears the signal, the calling party sets the telephone set to the on-hook condition. The on-hook condition is detected through the ringing circuit 1 and the input port I-1 of the CPU 2. As a result, the relay Y-1, which was set to ON is set to OFF, and the device is placed in the waiting condition.

When the solid state memory 3 is filled with the incoming message by repeating the above operation, the apparatus carries out only answering to the received signal, because the solid state memory can not record any more incoming messages. At this time, it is possible to switch the outgoing message to an exclusive outgoing message.

Anyway, when the signal is received and the output of the outgoing message OGM is finished, the finishing is detected through the input port I-3, the facsimile processing section 10 is operated through the output port O-5 as above, and the discrimination signal of the facsimile device is output to the calling party. When the calling party does not need to use the facsimile apparatus, the calling party can understand by listening to the discrimination signal that the incoming message can not be recorded, and the calling party sets the telephone set to the on-hook condition. The device is placed in the waiting condition by being on-hook as discussed above.

Each mode when the calling party needs to use the facsimile apparatus will be now described, in order.

(i) When the facsimile device of the calling party is standard.

In this case, the calling party calls this device as above. After the calling party listens to the outgoing message and records the incoming message, and after the calling party listens to the discrimination signal, the calling party pushes the button of the facsimile apparatus (not shown in the drawing) of the calling party side, and as a result, the specific tone is output from the facsimile apparatus of the calling party side. Following some "handshaking", the facsimile apparatus of each side is set to the condition of communication, and it is possible to send a letter. This operation is not discussed, because it is known well.

(ii) When the facsimile apparatus of the calling party side has a means for sending the CNG signal;

In this case, after this device is called by the facsimile apparatus of the calling party side, and the condition of talking over the telephone is,.set, the CNG signal (1100 Hz) is input during sending of the outgoing message. The CNG signal is detected by the CNG signal receipt section 11 through the line transformer LT and the amplifier 12, and as a result, the facsimile processing section 10 is operated such as by the start signal, the discrimination signal is output from the facsimile processing section 10 as in the above explanation, and the facsimile apparatus at each side is set to the condition of communication.

(iii) When the facsimile apparatus at each side is set to the condition of communication by the specific signal sent from the calling party side.

In this case, the specific signal is a DTMF tone signal which can be changed by the user of the facsimile. During sending the outgoing message or after recording the incoming message, a button #, for example on the telephone set (DTMF tone type) is pushed, the # tone is generated at this time, and the # tone is decoded by the tone decoder 9 through the line transformer LT and the amplifier 8. When the # tone is decoded, and is determined by the CPU 2 to be the previously programmed tone the facsimile processing section 10 is operated through the output port O-5, as in the above explanation, and the facsimile apparatus at each side is set to the condition of communication.

(iv) When the facsimile apparatus at each side is set to the condition of communication after the calling party side talks to the called party side.

As in the above explanation, when the ringing signal from the calling party is received, the device records the message from the calling party after the outgoing message is output. The voice from the calling party can be monitored through the line transformer LT, the hybrid circuit 13, the amplifier 7, the amplifier 14, and the speaker 15 by outputting the outgoing message or recording the message from the calling party. Accordingly, when the called party hopes to talk with the calling party, the called party sets the telephone set TEL to the off-hook condition. This off-hook condition is detected by the ringing circuit 1. As a result, the relay Y-1 is set to OFF through the input port I-1. Accordingly, the contact y1-1 opens, and the operation as the telephone answering device is released.

At the same time, the output detected by the off-hook of the telephone set TEL sets the relay Y-2 to On through the input port I-5 of the CPU 2. The resistance R1 is connected with the capacitor C1 through the point of contact y2-1, forming an optional sub-loop, as shown in the drawing.

After talking over the telephone, when the calling party hopes to communicate by the facsimile apparatus, the # tone is sent from the calling party as above. This signal is detected through the resistance R1, the condenser C1, and the line transformer LT as above. As a result, the facsimile apparatus between the calling party and called party are operated. The relay Y-1 is set to ON at the same time when the facsimile apparatus is operated. The telephone line is set to the closed condition by the point of contact y1-1, and the closed condition of the telephone line by the telephone set is released by the signal from the BUSY terminal of the facsimile processing section 10.

Thus, the foregoing description of the preferred embodiment of the invention has been presented for purposes of illustration and description and is not intended to be exhaustive to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated thereof. It is intended that the scope of the invention be defined by the claims appended hereto, when interpreted in accordance with full breadth to which they are legally and equitable entitled.

What is claimed:

1. An interface for connecting a facsimile apparatus to a telephone line comprising:

a microprocessor;

means for enabling the starting of operation of said facsimile apparatus in response to any of a plurality of input signals including a start signal generated by the microprocessor and a calling tone signal (CNG) sent from a calling party's apparatus;

ringing circuit means operative in response to an incoming telephone call to provide a control input signal to said microprocessor;

relay means for telephone line engaging, energized by an output from said microprocessor when said control signal is inputted, to engage a main loop; and telephone answering and recording means for automatically generating an outgoing message and recording an incoming message in response to the engagement of said main loop;

said microprocessor including
   (a) means for detecting an occurrence of a predetermined condition; and
   (b) means for generating said start signal in response to said predetermined condition;

said interface thereby starting operation of said facsimile apparatus in response to said predetermined condition.

2. The interface of claim 1, wherein said predetermined condition comprises completion of said incoming message.

3. The interface of claim 1, wherein said predetermined condition comprises receipt of a coded signal on the telephone line.

4. The interface of claim 1, including circuit means for releasing said relay means in response to detection of an off-hook operation of a telephone set connected to the telephone line to return said facsimile apparatus, having been enabled in response to the incoming call, to a standby mode without being operated.

5. The interface of claim 4, further including second relay means for engaging a sub loop for DTMF tone reception in response to the off-hook operation, wherein said facsimile apparatus is operated in response to sending of a DTMF tone by either a calling party or a called party after a direct conversation between them, and for thereafter releasing said sub loop.

* * * * *